Dec. 24, 1968   L. C. LOFTICE   3,418,194
DECORATIVE FLOWER AND FLOWER HOLDER
Filed June 2, 1965   2 Sheets-Sheet 1

INVENTOR.
LESTER C. LOFTICE
BY *Kimmel, Crowell & Weaver*
ATTORNEYS.

Dec. 24, 1968     L. C. LOFTICE     3,418,194
DECORATIVE FLOWER AND FLOWER HOLDER
Filed June 2, 1965     2 Sheets-Sheet 2

INVENTOR.
LESTER C. LOFTICE
BY Kimmel, Crowell & Weaver
ATTORNEYS.

United States Patent Office 3,418,194
Patented Dec. 24, 1968

3,418,194
DECORATIVE FLOWER AND
FLOWER HOLDER
Lester C. Loftice, 3509 June Drive, Dallas, Tex. 75211
Filed June 2, 1965, Ser. No. 460,652
1 Claim. (Cl. 161—27)

ABSTRACT OF THE DISCLOSURE

A flower holder including a plurality of superposed layers of plastic material formed into intertwined loops such that an artificial flower stem may be inserted through a plurality of the loops in a plurality of the layers is disclosed.

---

This invention relates to decorative flowers and flower holders, and more particularly to an artificial flower and flower holder which provide a tenacious but releasable connection therebetween.

Various artificial flower holders have been devised by the prior art to receive and hold the stem of an artificial or natural flower. While each of the devices of the prior art may have its advantages, a common disadvantage to all has been the inability to tenaciously hold the stem of a flower. It is accordingly a primary object of the instant invention to provide a flower holder made of artificial material which will tenaciously hold the stem of a flower.

Another object of this invention is to provide an artificial flower which may be temporarily inserted into a flower holder.

A further object of this invention is to provide a flower holder made of artificial material having a large number of intertwined loops for the reception of the stem of a flower.

A still further object of this invention is to provide a flower holder made of a material which has been woven to form a large number of loops.

Another object of this invention is to provide a flower holder made from a hose or sheath of woven material having a large number of intertwined loops.

Other objects and advantages of this invention reside in the combinations of elements, arrangements of parts, and features of construction and use, some of which will be apparent and some of which will be more fully pointed out hereinafter and disclosed in the accompanying drawings, wherein there are shown preferred embodiments of this inventive concept.

Figure 1:
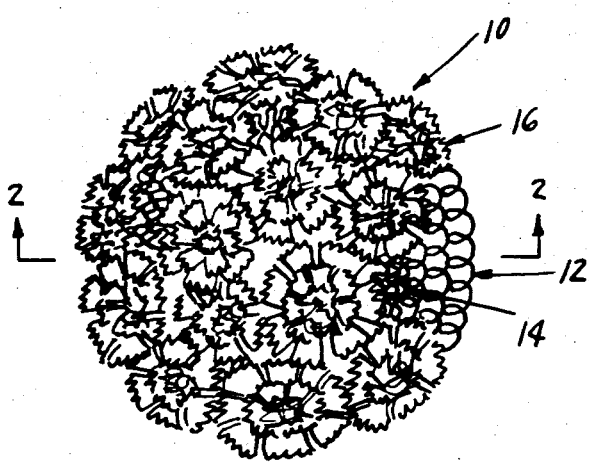
FIGURE 1 is a top plan view of a flower arrangement utilizing the flower holder and flower of the instant invention.

Referring now to the drawings in detail, wherein like reference characters designate like elements throughout the several views thereof, there is indicated generally at 10 a decorative flower arrangement comprising an open top receptacle shown generally at 12, a flower holder indicated generally at 14 providing a plurality of coarse intertwined loops and a plurality of artificial flowers shown generally at 16, although the flower holder of the instant invention is equally useful in conjunction with natural flowers.

Receptacle 12 may be of any convenient nature, but as illustrated herein comprises a shallow cylindrical dish 18 and an annular decorative portion 20. It should be understood that when utilizing the flower holder of the instant invention in conjunction with natural flowers, a much deeper receptacle should be used to hold the required amount of water.

Figure 6:
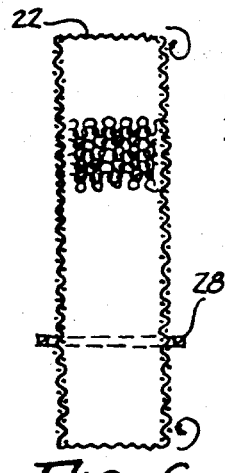
FIGURE 6 is a view of the hose or sheath of woven material that constitutes the flower holder of the instant invention, certain parts being broken away for clarity of illustration.
Figure 8:
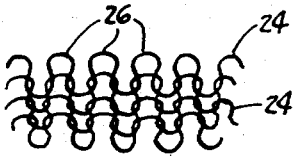
FIGURE 8 is an enlarged view of the material that constitutes the flower holder of the instant invention, emphasizing the coarse intertwined loops.
Figure 7:
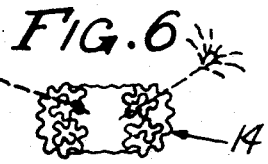
FIGURE 7 is a view of the sheath or hose of material of FIGURE 6 after it has been prepared for use as a flower holder showing certain flowers inserted through the plurality of loops.

As shown in FIGURES 2 and 6 to 8, flower holder 14 is made of a sheath or annular ring 22 of woven material, which is preferably plastic so that it may hold its shape even when wet. As indicated in FIGURES 6 and 8 a single filament of material 24 is woven, as by knitting, purling or combinations thereof, into sheath 22 having a multitude of intertwined loops 26. As indicated more fully hereinafter, an important feature of this invention is the coarseness of the loops of sheath 22 which are later juxtaposed with similar loops to form flower holder 14. Accordingly, loops 26 should be at least 1/16 inch in height and preferably about 1/4 inch.

Although any suitable manipulation of sheath 22 may be utilized to create a ball of material having a plurality of coarse juxtaposed loops, one such method is to place a rubber band 28 about sheath 22 and then roll the upper and lower ends thereof as indicated by the arrows in FIGURE 6 to form a roll of woven material above and below rubber band 28. The larger of these rolls, which will necessarily be the upper one in FIGURE 6 since rubber band 28 is positioned further from the upper end than the lower end, is then pulled over the smaller roll to form a ball of material having a plurality of coarse loops as previously indicated for the reception of the stem of a flower.

Flower holder 14 may be positioned in shallow dish 18 and secured thereto by mastic or other waterproof glue, but such is not necessary when utilizing a deep dish as when utilizing flower holder 14 for natural flowers.

Figure 3:
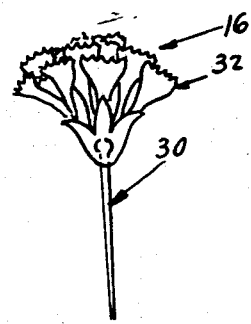
FIGURE 3 is a side elevational view of the flower utilized in the decorative arrangement of FIGURES 1 and 2.
Figure 2:
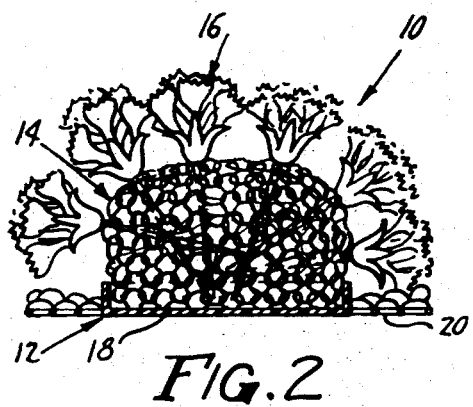
FIGURE 2 is a cross-sectional view of the decorative arrangement of FIGURE 1 taken along line 2—2 thereof and viewing in the direction of the arrows.
Figure 10:
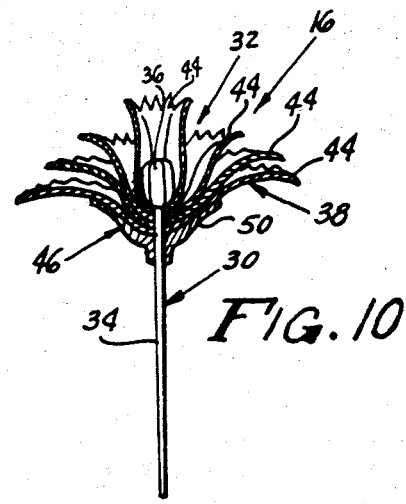
FIGURE 10 is a longitudinal cross-sectional view of the flower of the instant invention.
Figure 9:
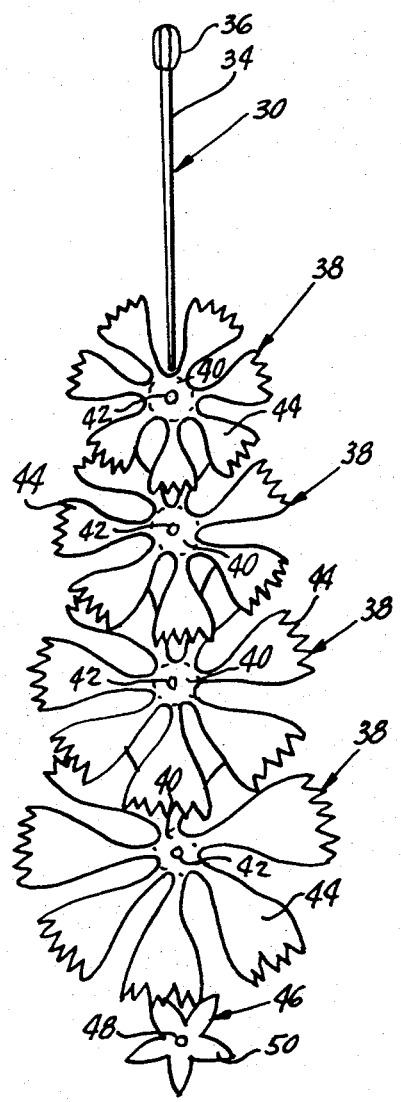
FIGURE 9 is an exploded view of the flower utilized in FIGURES 1 through 5.

Referring now to FIGURES 3, 9 and 10, artificial flower 16 includes a central plastic stem indicated generally at 30 and a simulated flower bud indicated generally at 32. Stem 30 includes an elongated tapering shank 34 having its minimum diameter at the free end thereof and having an enlarged head 36 fixedly secured to the end having the maximum diameter. Flower bud 32 includes a plurality of stamped initially circular plastic discs shown generally at 38 of decreasing size having a central circular disc 40 forming a central aperture 42. Extending radially from circular disc 40 are a plurality of plastic petals 44 of decreasing size. It should be apparent that petals 44 may be of any desired shape or color to simulate any naturally occurring flower. A simulated plastic epicalyx indicated generally at 46 comprises a centrally disposed aperture 48 and a plurality of radially extending leaf-like projections 50. Each of apertures 42, 48 is somewhat smaller than the maximum diameter of shank 34 such that each of discs 38 will be frictionally held thereon.

Figure 5:
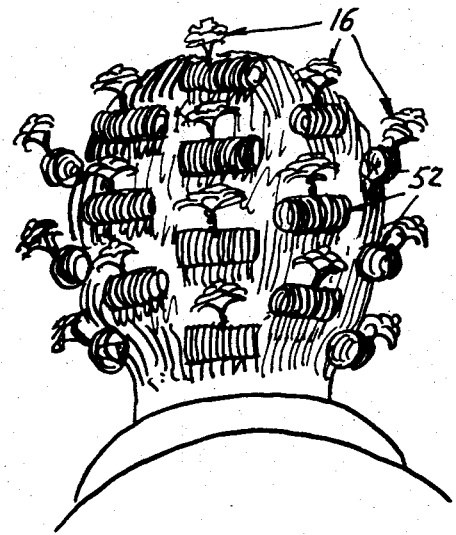
FIGURE 5 is a rear pictorial view of a lady utilizing the flower of FIGURE 3 to hold a plurality of hair rollers in place.
Figure 4:
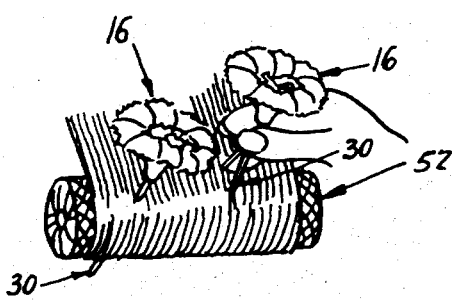
FIGURE 4 is a pictorial view of the flower of FIGURE 3 being inserted into a hair roller.

As shown in FIGURES 4 and 5, there are additional uses of artificial flower 16, which includes their use to hold a hair roller indicated generally at 52 in place after a lady's hair has been set as shown in FIGURE 5.

It is now seen that there is herein provided an improved decorative flower and flower holder which has all of the objects of this invention and others including many advantages of great practical utility and commercial importance.

Since many embodiments may be made of the instant inventive concept, and since many modifications may be made of the embodiment hereinbefore shown and described, it is to be understood that the foregoing is to be taken merely as illustrative and not in a limiting sense.

I claim:

1. In combination, an impervious receptacle having an open top, a ball of plastic material containing a plurality of superposed layers with each layer including a plurality of intertwined juxtaposed coarse loops, means securing said ball in said receptacle, and an artificial flower having a stem, said stem extending through a plurality of said loops in a plurality of said layers, said stem being formed of plastic and having an elongated tapering shank with an enlarged head integrally formed on the larger end of said shank, said flower including a plurality of plastic petals frictionally secured on said stem.

References Cited

UNITED STATES PATENTS

| | | | |
|---|---|---|---|
| 1,515,787 | 11/1924 | Nishiyama et al. | 161—27 |
| 3,039,220 | 6/1962 | Fristot | 161—30 |

JACOB H. STEINBERG, *Primary Examiner.*

U.S. Cl. X.R.

161—30; 24—5; 248—27.8; 47—41